United States Patent [19]

Fuchs et al.

[11] 4,246,149
[45] Jan. 20, 1981

[54] COLD-CROSS LINKING DISPERSION ADHESIVES

[75] Inventors: Gundolf Fuchs, Hemmingstedt; Heiko Humbert, Hamburg; Dietrich Pirck, Seevetal, all of Fed. Rep. of Germany

[73] Assignee: Deutsche Texaco Aktiengesellschaft, Hamburg, Fed. Rep. of Germany

[21] Appl. No.: 4,140

[22] Filed: Jan. 17, 1979

Related U.S. Application Data

[63] Continuation-in-part of Ser. No. 824,634, Aug. 15, 1977, abandoned.

[51] Int. Cl.$^3$ ........................... C08J 3/24; C08K 5/10
[52] U.S. Cl. ........................... 260/27 R; 260/29.6 AT; 260/29.6 CM; 260/29.6 T; 260/29.6 TA; 525/327
[58] Field of Search ........ 260/27 R, 29.6 T, 29.6 TA, 260/29.6 AT, 29.6 CM; 526/14

[56] References Cited
U.S. PATENT DOCUMENTS

| | | | |
|---|---|---|---|
| 3,972,857 | 8/1976 | Kaizerman et al. | 526/14 |
| 3,976,610 | 8/1976 | Morris et al. | 526/14 |
| 4,141,867 | 2/1979 | Fuchs et al. | 260/27 R |
| 4,144,208 | 3/1979 | Fuchs et al. | 260/27 R |

*Primary Examiner*—V. P. Hoke
*Attorney, Agent, or Firm*—Carl G. Ries; Robert A. Kulason; Henry W. Archer

[57] ABSTRACT

Disclosed is a polyacrylic acid-esters based adhesive copolymer prepared from 85–65 percent by weight of 2-ethylhexylacrylate; O-20-n-butylacrylate; 8–12 acrylonitrile 2–6 acrylic acid; 0.5 to 2 acrylamide and/or 0.5 to 2 hydroxyalkylmethacrylate and from 1 to 2 percent by weight basis copolymer of an external cross linking agent having at least two ClCH$_2$CO groups. The adhesive is prepared in the form of aqueous dispersion, having a solids content of about 40 to 60 percent by weight and a viscosity range of about 800 to 1000 cPs.

4 Claims, No Drawings

COLD-CROSS LINKING DISPERSION ADHESIVES

CROSS-REFERENCE TO CO-PENDING APPLICATION

This application is a continuation-in-part of copending application Ser. No. 824,634 filed Aug. 15, 1977 and now abandoned.

FIELD OF THE INVENTION

This invention relates to aqueous cold hardening copolymer dispersions based on polyacrylic acid esters.

German Pat. No. 1,594,147 describes the preparation of a cross-linkable copolymer and admixes a cross-linking component, e.g., a resin. The cross-linking takes place only after the addition of a catalyst. From German Pat. No. 1,297,270 it is known to incorporate N-methylol-, N-methylether-, halogenhydrin and/or epoxide groups by way of polymerisation into a copolymer of vinylacetate, vinyl-propionate and/or acrylate monomers. In many cases cross-linking takes place after the application of the adhesive but in some cases it is recommended to add a reaction accelerator, such as an acid or a base. Because the cross-linking at once ensues after admixing a catalyst with an adhesive, adhesive-catalyst systems are unsuitable where large areas are to be treated.

From R. Reinecke and W. Schmieder ("Adhasion" 1973 pp 312–316) comes the proposal to incorporate monochloroacetic acid vinyl ester by way of polymerisation into a copolymer. The cross-linking takes place after addition of aqueous alkali. Monochloroacetic acid vinyl ester is, however, unobtainable in commerce and because the compound is very unstable it is also unsuitable in practice. Finally German Pat. No. 1,643,144 should be mentioned in which is described a method of preparing halogenated acrylic acid esters, such as chloroacetoxyethylacrylate. These compounds are recommended as comonomers for the production of elastomers, which can be vulcanized owing to the presence of the reactive halogen.

Of disadvantage in these known dispersion adhesives having a built-in (internal) cross-linking agent is the fact that the polymerisation and the neutralisation of dispersions when polymerised in a strongly acid environment must be effected prematurely before the application of the adhesive. It is at the high temperatures of 70°–80° C., such as exist at the end of the polymerisation reaction that the reactive groups of the copolymer are particularly reactive to alkali, yet the pH value of the polymerized dispersion must be already increased at the beginning of the cooling because otherwise the viscosity rises too steeply.

OBJECTS AND SUMMARY OF THE INVENTION

The main object of this invention is the provision of dispersion adhesives wherein the cross-linking agent is not built-in but is subsequently added. Thus, dispersion adhesives are provided, which have an external instead of an internal cross-linking agent.

This invention resides in aqueous cold-cross linking dispersions based on polyacrylic acid esters, characterized by an aqueous dispersion containing (a) a copolymer prepared from, in % by weight, 85–65 2-ethyl-hexylacrylate, 0–20 n-butylacrylate, 8–12 acrylonitrile, 2–6 acrylic acid, 0.5–2 acrylamide, and/or 0.5–2 hydroxyalkylmethacrylate, (b) 1–2% by weight, based on the copolymer, of a compound acting as an external cross-linking agent having at least two $Cl.H_2.CO$ groups and optionally, (c) colophonium, fillers and other known adhesive additives, and having a solids content from about 40 to 60% by weight and a viscosity in the range of from 800 to 1000 cPs.

Surprisingly, it has been found that for cross-linking of dispersion adhesives on the basis of polyacrylic acid ester copolymers, the cross-linking agents need not be incorporated by polymerisation into the copolymer, but may be separated and can be added at any desired instant after the completion of the copolymerisation and prior to the application of the adhesive, if there are incorporated into the copolymer by way of polymerisation a small quantity of hydroxyl-and/or amino group-containing monomers, and by using as the cross-linking agent a compound having at least two $Cl.CH_2.CO$ groups.

The external cross-linking agents according to the invention are compounds having at least two carbonyl groups or at least two ester groups in the molecule, which carry chlorine at those carbon atoms in the alpha position to the carbonyl or the carboxyl group.

Such compounds are, for example, bis-chloroaceto acetoxyethane, butane, hexane, and 2,2-dimethylpropane; the 2-chloroacetyldiester of glycol, the 2-chloracetyl-diester or triester of glycerin and other di-or poly-2-chloroacetylesters of polyhydric alcohols. Particularly suitable are compounds of the general formula (I)

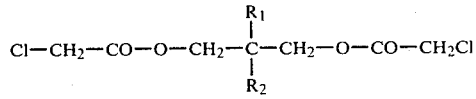

in which $R_1$ is a $ClCHCOOCH_2$ group or an alkyl group with 1 to 4 carbon atoms and $R_2$ is an alkyl group with 1 to 4 carbon atoms. Also suitable are compounds of the formula (2)

wherein $R_3$ is an alkylene group having 2 to 6 carbon atoms.

Examples thereof are 1,3-neopentylene bis(monochloroacetate) 1,1,1-tris (chloro acetoxy methyl) pentane.

The copolymers in the inventive adhesive dispersions consist mainly, i.e. up to 85% by weight, of 2-ethylhexylacrylate of which up to 20% can be replaced by butylacrylate. By polymerisation of these monomers, the "open time", that is the time between application of the adhesive dispersion and the setting is indeed somewhat curtailed, but the tensile strength and thermal stability are further improved. Acrylonitrile is incorporated by way of polymerisation in a proportion of 8–12% by weight, preferably 10%, whereby good adhesion is insured. The copolymer also contains as a monomer unit 2–6%, preferably 5% by weight of acrylic acid and 1.5–3% preferably 2% by weight of a monomer unit with hydroxyl groups and/or amino groups, such as acrylic amide, β-hydroxyethyl or -propyl methacrylate. The presence of the compounds ensures that the copolymer contain the functional groups necessary for the reaction with the external cross-linking agent.

The advantages which are achieved by the dispersion adhesives according to the invention are that the preparation of the copolymer dispersion is facilitated, that is to say there is no risk of a premature cross-linking during the neutralisation after the completion of the polymerisation. Furthermore, by controlling the quantity of the cross-linking agent which is added it is possible to suit the mechanical strength and heat resistance of the adhesive to the existing requirements. The cross-linking agent can be added to the polymer dispersion at any desired time between the completion of the copolymerisation and the application of the adhesive.

The invention, and the advantages which accrue therefrom, will now be more clearly stated with reference to the following examples.

General description of the examples:

The examples were carried into effect with dispersion adhesives, which are different from each other in respect of the proportions of 2-ethylhexylacrylate (EH) and n-butylacrylate (BU) in the copolymer, as well as in the type and the quantity of the cross-linking agent. In addition to carrying out examples according to the invention there were also carried out, for the purpose of comparison, examples with 2-chloroacetoxyethylmethacrylate as an internal cross-linking agent, that is to say a cross-linking agent built into the copolymer.

The dispersion adhesives were prepared in all the examples according to the same method. In each case there was prepared a monomer mixture A, B or C and, separately therefrom, an aqueous phase of the following composition.

|  | A | B | C |
|---|---|---|---|
| Monomer mixture (g) |  |  |  |
| ethylhexylacrylate (EH) | 425 | 340 | 255 |
| n-butylacrylate (BU) | — | 85 | 170 |
| acrylonitrile | 50 | 50 | 50 |
| acrylic acid | 15 | 15 | 15 |
| acrylic acid amide | 5 | 5 | 5 |
| hydroxyethylmethacrylate | 5 | 5 | 5 |
| EH/BU proportion | 100/00 | 80/20 | 60/40 |
| Aqueous phase |  |  |  |
| Water (desalinized) | 414.0 |  |  |
| Anionic emulsifier | 25.0 |  |  |
| Non-ionic emulsifier | 5.0 |  |  |
| Ammonium peroxydisulphate | 5.0 |  |  |
| Sodium disulphite | 0.5 |  |  |
| Defoamer | 0.5 |  |  |
| Soda lye (15-%) | 50.0 |  |  |

Description of the preparation of 1,000 g of dispersion (50-%):

¼ of the monomer mixture (125 g), the internal cross-linking agent, where appropriate, (0.62 or 1.25 g) and of the aqueous phase (125 g), were placed in a 2-1 reaction vessel and heated up to 75°–80° C. whilst being strongly stirred (400 rpm). Within this temperature range the polymerisation reaction started up with a clearly marked heat of reaction.

The remaining ¾ proportion of the monomer mixture, the internal cross-linking agent, where appropriate, and the aqueous phase in a pre-emulsified condition, were slowly added over a period of 2 hours. In this operation an internal temperature of about 80° C. was established, which was also maintained for a further hour, after completing the addition, for the purpose of finalizing the conversion.

From the polymerisation reaction there resulted 1,000 g of a fine particle, coagulate-free dispersion having a solid content of about 50%. The viscosity of the dispersion was below 1,000 cPs, and the pH value amounted to about 5.

In the case where an external cross-linking agent was introduced, after preparing the dispersion, and in parallel experiments, the prescribed quantity was added by mixing in the appropriate recipe. In both of the parallel experiments, the results were always similar.

The adhesive dispersions obtained by means of the examples were used to stick polyvinylchloride floor coverings into Eternit sheets. The coated parts were stuck together after different exposure times, and in each case the stripping resistance was determined as a measure of the "open time".

Furthermore test examples were stored at definite temperatures for predetermined periods, these being:

| Sample b | 7 × 24 hour at 20° C. |
|---|---|
| Sample c | 1 × 24 hour at 20° C. |
|  | 5 × 24 hour at 50° C. |
|  | 1 × 24 hour at 20° C. |

The thermal stability was determined as a measure for the temperature stability of the adhesive joint and the tensile shear strength was also determined.

A determination of the stripping resistance was made as follows: A layer of dispersion adhesive in a thickness of about 0.3 mm was applied to an "Externit" sheet (50×60 mm), and after an exposure time between 5 and 60 minutes a PVC film (40×100 mm; adhering area surface 40×40 mm) was stuck to it at a pressure of 0.1 kp/cm² for 10 seconds. Immediately afterwards, the adhered joint was stripped at a shearing force of 75 g at 20° C. at a stripping angle of 90°, and the time taken for complete release was measured in minutes.

Determination of the thermal stability: A layer of dispersion adhesive was applied in a thickness of about 0.3 mm to a plate of "Eternit", was allowed to dry for 120 minutes, to which a PVC film was stuck at a pressure of 3 kp/cm² for 10 seconds, the overlapping surface of the joint being 4 cm. After one hour at room temperature, a weight of 800 g was suspended from the lower edge of the film projecting beyond the vertically held Eternit plate, and at 100° C. the time within which the adhesive joint was released was measured in minutes.

A determination of the tensile-shear strength was made as follows: A layer of dispersion adhesive was applied in a thickness of about 0.3 mm to a plate of "Eternit", was allowed to dry and a PVC film of the same size was applied thereto at a pressure of 3 kp/cm² for 10 seconds. After being stored at room temperature for 1 hour, the film was moved in a vertical direction through 100 mm per minute and the force necessary to do this was measured in kp/10 cm².

The examples are set out below in tabular form. The table shows the monomer mixture from which the copolymer has been prepared, which cross-linking agent was used and the quantities in which it was added. The Table also shows the properties of the dispersion adhesive prepared in the individual examples, that is to say the "open time", the tensile-shear strength and its thermal stability.

The following conclusions can be drawn from the Table:

1. All of the dispersion adhesives according to the invention satisfy the minimum specifications. This is not so in the case of the comparison example No. 8 even though, amoung the comparison tests, this exhibits the highest shear strength, because the open time at 15 minutes, with a maximum of 25 minutes, is still too short.

2. Given the same concentration of cross-linking agent (compare Example 3 with Example 7) higher values of thermal stability and tensile shear strength are achieved, for the same open time, by the external cross-linking agents according to the invention. Even if only on the basis of substantially better accessibility of the extenal cross-linking agents, these will have achieved a technical advance by giving equally good results as those of the internal cross-linking agents.

3. An increase in strength by increasing the concentration of cross-linking agent is demonstrated by the fact that in Example 5 using the monomer mixture A maximum strength values are already obtained whilst in Example 1 this limit is not yet reached (109 kp/10 cm$^2$ is the destruction limit of the PVC film under test). In any case the increase in strength is achieved at the expense of the open time, so that the example does not fall below the specification limits.

TABLE I

| Example | Examples according to the invention | | | | | Comparison examples | | |
|---|---|---|---|---|---|---|---|---|
| | 1 | 2 | 3 | 4 | 5 | 6 | 7 | 8 |
| Monomer mixture | A | A | B | A | A | A | B | B |
| Cross-linking agent* | K | II | I | III | I | IV | IV | IV |
| Cross-linking agent-quality (wt.%) | 1 | 1 | 1 | 1 | 2 | 0.5 | 1.0 | 0.5 |
| Open time (min.) | 5–60 | 7.5–60 | 10–50 | 7.5–60 | 7.5–50 | 7.5–55 | 10–50 | 10–25 |
| Tensile-shear-strength | | | | | | | | |
| b | 105 | 105 | 109 | 107 | 109 | 100 | 105 | 108 |
| c | 100 | 100 | 109 | 103 | 109 | 95 | 102 | 106 |
| Thermal stability | | | | | | | | |
| b | 6 | 6 | 6.5 | 6.5 | 6 | 6.5 | 5.5 | 5.5 |
| c | 10.0 | 9.5 | 11.0 | 10.0 | 9.5 | 9,5 | 9.5 | 8.5 |

I 2,2-dimethylpropane 1,3 bis (chloroacetate) - Cross-linking agent of the invention
II Hexane 1,3 bis(chloroacetate) - Cross-linking agent of the invention
III 1,1,1-tris(chloro-methyl)pentane - Cross-linking agent of the invention
IV 2-(2-chloroacetoxy)ethylmethacrylate Specification-minimum values: Tensile-shear-strength   b   105   c   100
Thermal stability   b   5   c   8.5
Open time 10–45

What is claimed is:

1. Polyacrylic acid ester-based adhesive comprising an aqueous dispersion containing:
   (a) a copolymer prepared from, 85–65% by weight, of 2-ethyl-hexylacrylate, 0–20 percent of n-butylacrylate, 8–12 percent of acrylonitrile, 2–6 percent of acrylic acid, 0.5–2 percent of acrylamide, and/or 0.5–2 percent of hydroxyalkylmethacrylate,
   (b) 1–2% by weight, based on the copolymer of an external cross-linking agent defined by the formula:

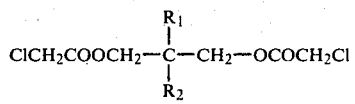

wherein $R_1$ is a $ClCH_2COOCH_2$ group or an alkyl group having 1 to 4 carbon atoms and $R_2$ is an alkyl group having 1 to 4 carbon atoms and optionally,
   (c) colophonium, fillers and other adhesive additives, said dispersion having a solids content from about 40 to 60% by weight and a viscosity in the range of from 800 to 1000 cPs.

2. Adhesive as claimed in claim 1, wherein 1,3-neopentylene bis(monochloroacetate) is the cross-linking agent.

3. Adhesive as claimed in claim 1, wherein 1,1,1-tris-(chloroacetoxy methyl)butane is the cross-linking agent.

4. Adhesive as claimed in claim 1, wherein said cross-linking agent is a compound of the general formula:

$$(ClCH_2COCH_2COO)_2R_3$$

in which $R_3$ is an alkylene group having 2 to 6 carbon atoms.

* * * * *